(12) United States Patent
Joubert et al.

(10) Patent No.: US 6,938,306 B2
(45) Date of Patent: Sep. 6, 2005

(54) HIGH STRENGTH HOOK, IN PARTICULAR FOR ELASTIC CABLE

(75) Inventors: Xavier Joubert, Ambert (FR); Thierry Joubert, Ambert (FR)

(73) Assignee: Joubert S.A., Ambert (FR)

( * ) Notice: Subject to any disclaimer, the term of this patent is extended or adjusted under 35 U.S.C. 154(b) by 0 days.

(21) Appl. No.: 09/485,225

(22) PCT Filed: Aug. 8, 1998

(86) PCT No.: PCT/FR98/01769

§ 371 (c)(1),
(2), (4) Date: Feb. 23, 2000

(87) PCT Pub. No.: WO99/08010

PCT Pub. Date: Feb. 18, 1999

(65) Prior Publication Data

US 2002/0162196 A1 Nov. 7, 2002

(30) Foreign Application Priority Data

Aug. 8, 1997 (FR) ............................................ 97 10210

(51) Int. Cl.⁷ .......................... F16B 45/00; A44B 21/00
(52) U.S. Cl. ..................................... 24/300; 24/265 H
(58) Field of Search ........................... 24/265 H, 598.5, 24/905, 300, 370, 482, 715.3, 715.6, 715.5, 712, 128, 129 D, 714.3, 714.6, 715.2, 115 A, 298, 301, 136 R, 115 M, 115 L, 136 L, 116 A; 248/322, 300, 301, 635, 302, 317, 690, 691, 692, 100, 211, 212, 490, 497, 339, 499, 500; 292/95, 114, 104, 136; 294/74, 82.1, 82.2, 82.3; 403/287, 277, 284

(56) References Cited

U.S. PATENT DOCUMENTS

| | | | | |
|---|---|---|---|---|
| 2,487,085 A | * | 11/1949 | Wridge | 294/82.1 |
| D196,852 S | * | 11/1963 | Oldak | D8/382 |
| 3,749,703 A | * | 7/1973 | Maillocheau | 24/265 SH |
| 4,010,794 A | * | 3/1977 | Einhorn | 164/94 |
| 4,559,677 A | * | 12/1985 | Tracy | 24/300 |
| 5,159,861 A | * | 11/1992 | Anderson | 81/487 |
| 5,317,788 A | * | 6/1994 | Esposito et al. | 24/300 |
| 5,383,259 A | * | 1/1995 | McIntire | 24/300 |
| 5,423,108 A | * | 6/1995 | Brennan | 24/134 R |
| 5,432,983 A | * | 7/1995 | Mackal | 24/136 R |
| 5,435,044 A | * | 7/1995 | Ida | 24/136 R |
| 5,454,140 A | * | 10/1995 | Murai | 24/136 R |
| 5,517,735 A | * | 5/1996 | Tsai | 24/599.9 |
| D370,406 S | * | 6/1996 | Tsai | D8/382 |
| 5,546,639 A | * | 8/1996 | Lacore et al. | 24/265 H |
| 5,572,770 A | * | 11/1996 | Boden | 24/136 R |
| 5,630,257 A | * | 5/1997 | Brody et al. | 24/300 |
| 5,638,584 A | * | 6/1997 | De Anfrasio | 24/265 H |
| 5,642,558 A | * | 7/1997 | Bodkin, Sr. | 24/674 |
| 5,682,652 A | * | 11/1997 | Brody et al. | 24/300 |
| 5,735,329 A | * | 4/1998 | Akins et al. | 160/178.1 R |
| 5,839,768 A | * | 11/1998 | Wackerly | 294/74 |
| 5,920,963 A | * | 7/1999 | Chou | 24/170 |

FOREIGN PATENT DOCUMENTS

| | | |
|---|---|---|
| EP | 0 493 252 A | 7/1992 |
| FR | 2 059 879 A | 6/1971 |
| FR | 2 131 129 A | 11/1972 |
| FR | 2 455 693 A | 11/1980 |
| FR | 2 552 185 A | 3/1985 |
| GB | 1 364 201 A | 10/1974 |
| GB | 2 058 901 A | * 4/1981 ................ 248/322 |

* cited by examiner

*Primary Examiner*—Robert J. Sandy
(74) *Attorney, Agent, or Firm*—Connolly Bove Lodge & Hutz LLP

(57) ABSTRACT

The invention relates to a high strength hook. The hook comprises an annular metal insert (3) embedded in a synthetic material end block of the hook around a passage (4) for slidably receiving the end of a cable (5) in the vicinity of a stop abutment (4c) designed to stop the end of the cable in the traction direction. The invention is applicable to hooks comprising a metal hook having an end embedded in a handle block.

8 Claims, 3 Drawing Sheets

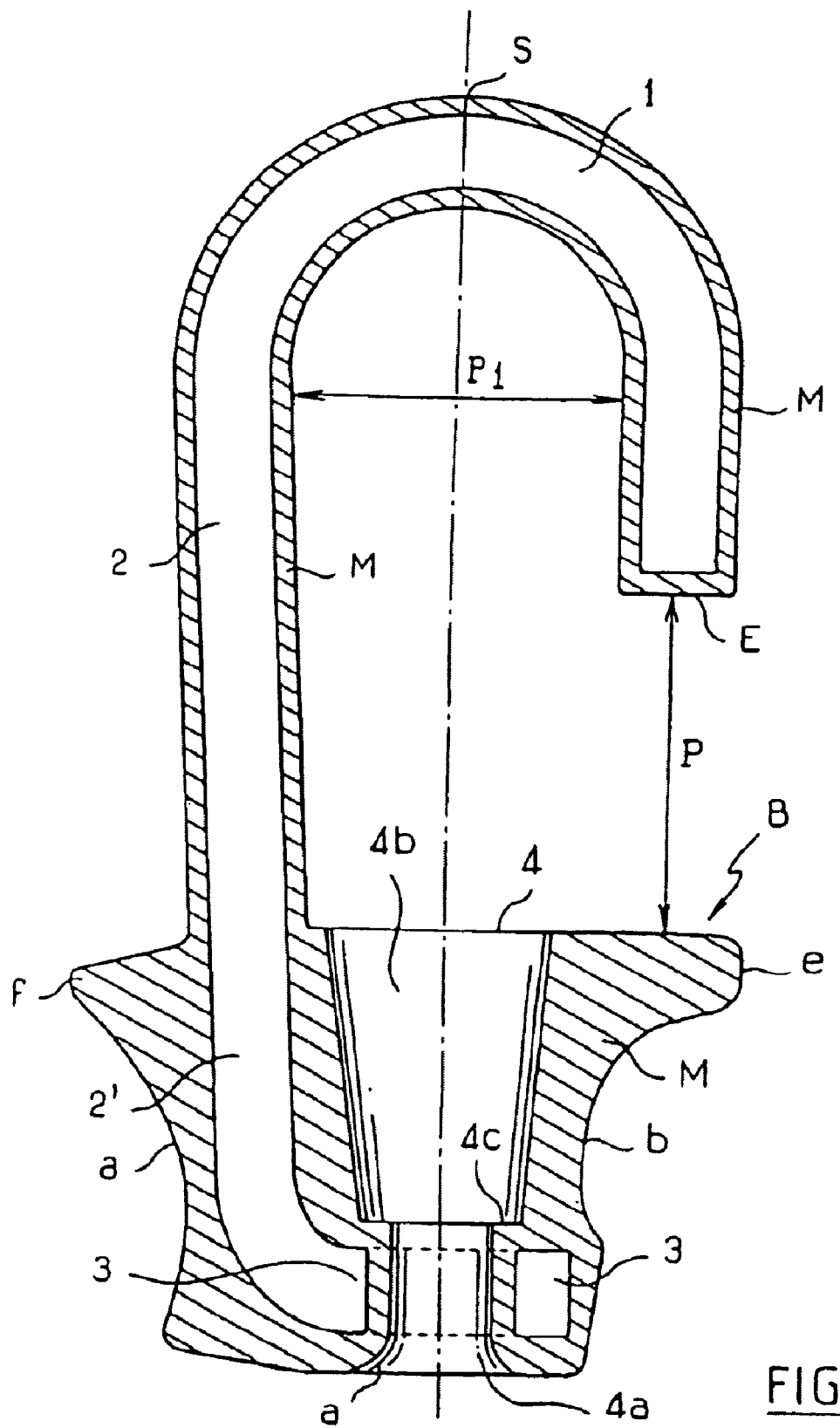
FIG_2

HIGH STRENGTH HOOK, IN PARTICULAR FOR ELASTIC CABLE

FIELD OF THE INVENTION

The present invention relates to a hook of the type having, at one end, a handle block of synthetic material shaped to facilitate taking hold of the hook and having a passage passing therethrough for receiving and retaining in the block a cable to which the hook is to be fixed.

BACKGROUND OF THE INVENTION

Such a hook is described in publication U.S. Pat. No. 5,317,788, for example.

To retain the cable in the hook when traction is applied to the cable tending to extract it from the hook, the passage tapers so as to define an abutment for stopping the end of the cable once said end has been enlarged after being passed through the passage. In the embodiment described in the above-specified publication, the end of the cable is enlarged by folding the end back onto the cable and by holding the end in place in a metal ring, and the passage through the block is designed so as to receive the enlarged end of the cable when traction is applied to the cable in a direction tending to extract it from the hook, such that the enlarged end comes to bear against the abutment which stops it (FIGS. 4 and 5).

When very high levels of traction are applied, that retention can be insufficient.

An object of the present invention is to improve that retaining device.

According to the present invention, this is achieved by embedding an annular metal insert in the block around said passage, in the vicinity of said taper.

In a preferred embodiment, the insert constitutes one end of reinforcement which extends over the full length of the hook, thereby further improving the strength of the hook

BRIEF DESCRIPTION OF THE DRAWINGS

An embodiment of such a hook is described below with reference to the figures of the accompanying drawings, in which:

FIG. 2 is a section of the hook including the axis of the passage through the handle block;

DETAILED DESCRIPTION OF THE INVENTION

In each case, the scale of the figures is appropriate for the corresponding explanations.

Figure 1:
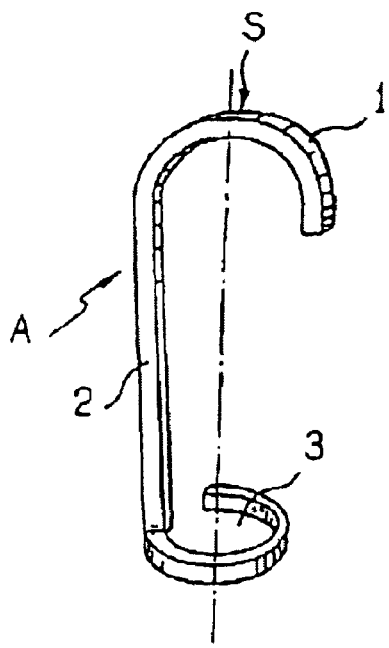
FIG. 1 is a diagrammatic perspective view of the reinforcement of the hook.

The reinforcement (A) of the hook is constituted (see FIG. 1) by a rigid metal wire (A) having one end (1) curved into an upside-down J-shape and having its other end bent so as to lie in a plane perpendicular to the plane of the J-shape and curved so as to form an open or closed ring (3) therein.

The hook is preferably made of steel flat with an optionally rounded edge, the hook being formed edgewise so as to provide the greatest possible strength.

The ring (3) is substantially on the same axis as the top (S) of the curve of the J-shape and the shank (2) of the J-shape slopes slightly outwards going away from the ring.

This wire is placed in the cavity of an injection mold so as to be coated in a synthetic resin or some other suitable material. For this operation, it is possible for example to use polyethylene or polypropylene for conventional hooks, or a polyamide or a reinforced polyamide for hooks that need to withstand abrasion.

The cavity is shaped so that the injected material (M) (FIG. 2) fits closely to the J-shaped portion (1) of the wire and to the shank (2), while being much thicker around the base (2') of the shank (2) and around the ring (3) of the wire so as to provide a finger grip block (B) having a through passage (4) whose axis is in line with the top of the curve of the J-shape.

The overall thickness of the block in a plane perpendicular to the plane of the J-shape of the hook can, for example, be three to five times the thickness of the coated shank and it is four to eight times said thickness in a plane parallel to the plane of the J-shape, given the projecting portions presented by the block.

The passage (4) forms an inlet duct (4a) which is cylindrical, for example, through which the end of a cable (5), preferably an elastic cable, is inserted into the hook, and it also forms an outlet duct (4b) whose shape is frustoconical, for example, opening out so as to face the curve of the J-shape, with the junction between the two ducts forming a shoulder (4c) which constitutes an abutment.

The mold cavity is designed so that the metal wire ring (3) is completely embedded in the injected material (M) and is situated around the inlet duct (4a) close to the shoulder (4c)

Figure 3:
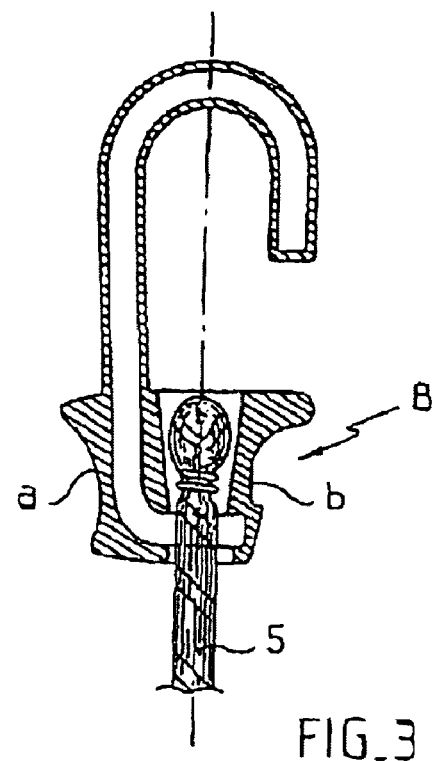
FIG. 3 is a longitudinal section of the hook fixed to a cable.
Figure 4:
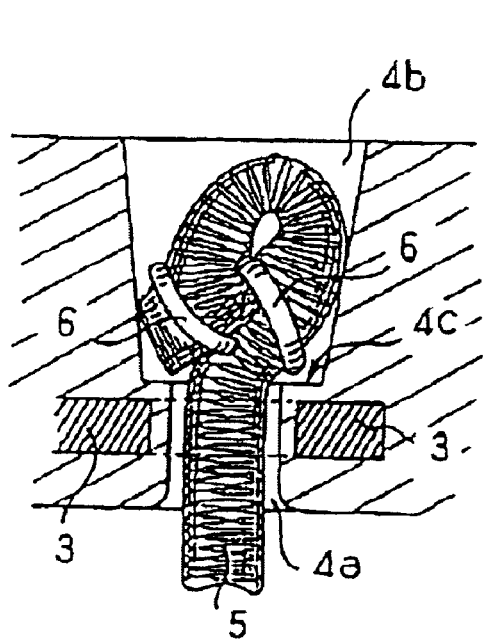
FIG. 4 is a diagrammatic perspective view of the crimped end of a cable retained in the passage of the handle block.

In a conventional manner, the end of the cable (5) is folded back onto itself and is crimped by means of a metal clip (6), e.g. a steel ring which is flattened after crimping. When traction is applied to the cable, this crimped end bears against the junction (4c) between the two ducts as reinforced by the ring (3) of the wire (1) (FIGS. 3 and 4).

The invention is not limited to using a clip for fitting to the end of the cable. It can be substituted by any means capable of maintaining the enlarged end of the cable.

The inlet edge (9) of the inlet duct (4a) is rounded so as to avoid the presence of any sharp edge which could injure the cable.

This advantage does not exist in hooks where the synthetic material is molded directly onto the cable since under such circumstances:

the plastics material becomes embedded in the cable, giving rise to sharp edges that can injure it; and contact between the molten material and the synthetic covering of the cable can degrade the covering.

The mold cavity is designed so that the finger grip block (B) is of any desired ergonomic shape, e.g. having lateral recesses (a, b, c, d) enabling the hook to be held between the fingers, together with projecting portions (e, f) against which the fingers can bear. The lateral recesses can be made in portions of the block which project from the block, such as the recess (a) situated beside the shank (2).

The projecting portion (e) which faces the end (E) of the hook serves for guidance purposes while the hook is being engaged on a bar or on any other part onto which it is to be hooked.

Figure 5:
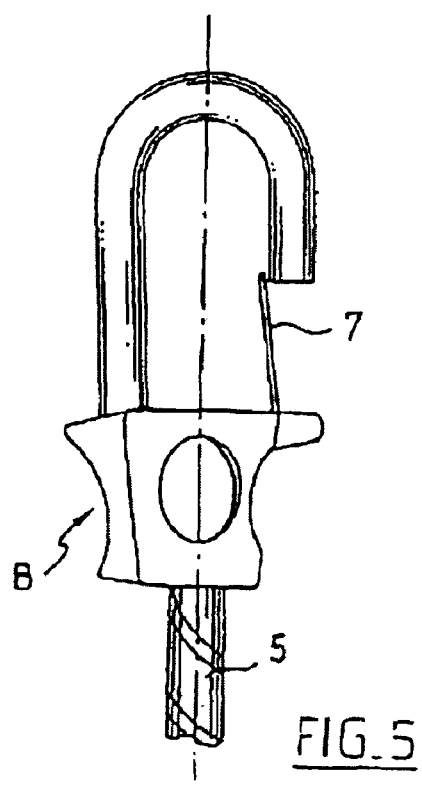
FIG. 5 is a perspective view of the hook provided with a safety tongue.
Figure 6:
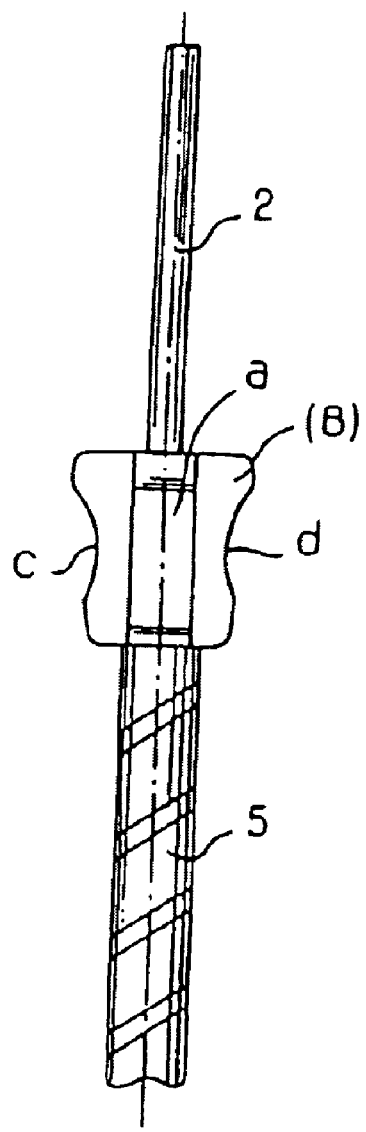
FIG. 6 is a view of the hook on a plane perpendicular to the plane containing the curve of the hook.

The molded block (B) can carry a pivoting safety tongue (7) suitable for bearing against the inside of the free end (E) of the hook (FIG. 5), in conventional manner.

A plug can close the inlet to the passage (4a) around the cable, thereby giving the hook a finished appearance.

Figure 7:
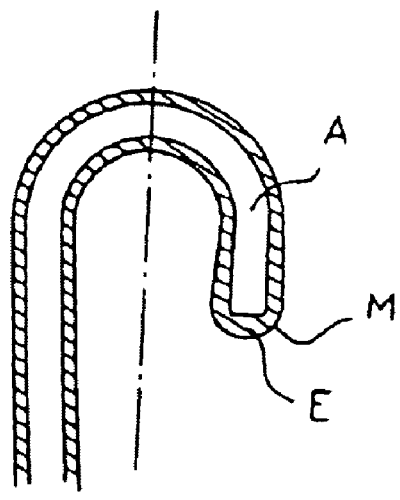
FIGS. 7 and 8 relate so detail variants.

The free end (E) of the hook can receive very effective protection by being coated with an extra thickness of material (FIG. 7).

Figure 8:
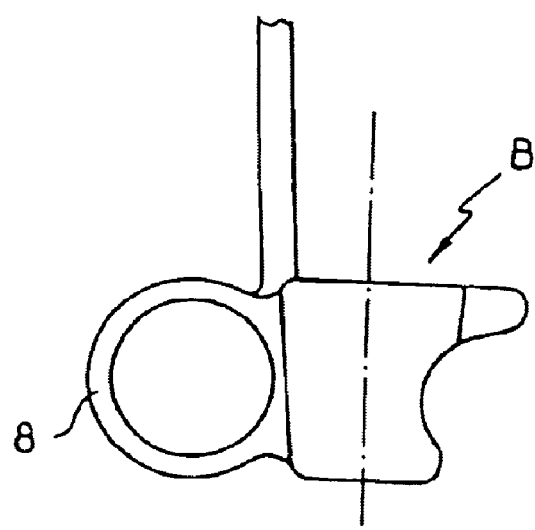

A ring handle (8) can be provided to make the hook easier to use in some cases (FIG. 8).

The strength of the hook is such that it can receive bars of large dimensions (P) and (P$_1$), whereas with a standard hook these dimensions must be restricted so as to avoid weakening the ability of the hook to withstand being prized open.

Another, non-negligible advantage of the invention lies in the possibility of regularly inspecting the quality of the crimping and the quality of the elastic, which is not possible with hooks that are molded directly onto the cable.

It will also be observed that the coating material does not have any holes, whereas in earlier devices, the locations of parts for holding the metal core in the mold leave the core visible at certain locations of the over-molded product, thereby requiring the locations to be provided with additional protection so as to avoid oxidation and swelling of the core, which could possibly lead to the coating being destroyed.

The invention is not limited to the embodiment described but extends to any variant that can be obtained by replacing the means described with means that are functionally equivalent.

What is claimed is:

1. A hook for a cable comprising:

a finger grip end block having a passage formed therethrough;

a solid cable slidably resting in the passage, the cable having a folded end secured by a crimped clip;

the passage having a circular inlet duct through which a straightened cable section passes;

the passage further having an outlet duct, larger than the inlet duct and receiving the folded cable end;

a junction between the inlet and outlet ducts forming a shoulder serving as a stop abutment for the folded cable end when the cable is placed in tension;

a rigid flat metal wire having an inverted J-shaped first end section facing the outlet duct, the inverted J-shaped first end section serving as a hook member, and the flat wire having an opposite end section bent into a ring embedded in the finger grip block, around the stop abutment, and located in a plane generally perpendicular to the J-shaped first end section, the ring serving to reinforce the shoulder that serves as a stop abutment; and wherein the ring surrounds said inlet duct in the vicinity of its junction with the outlet duct.

2. A hook according to claim 1, in which said ring has an axis passing through a top of a curve of the J-shaped first end section.

3. A hook according to claim 1, in which an inlet edge of the inlet duct is rounded so as to avoid leaving any sharp edge which could injure the cable.

4. A hook according to claim 1, in which the finger grip end block has lateral recesses and projections to form a finger grip.

5. A hook according to claim 1, in which the finger grip end block connects a tilting safety tongue fixed to said finger grip end block for bearing against a free inside end of the hook.

6. A hook according to claim 5, in which a free end is coated with extra injected material.

7. The hook according to claim 1, wherein an outer circular end of the inlet duct is outwardly flared to avoid a sharp edge from contacting the cable.

8. The hook according to claim 1, wherein the overall thickness of the block in a plane perpendicular to the plane of the J-shaped first end section is 3–5 times the thickness of the coated shank, and is 4–8 times said thickness in a plane parallel to the plane of the J-shaped end section.

* * * * *